United States Patent
Zhang et al.

(10) Patent No.: US 10,743,305 B2
(45) Date of Patent: Aug. 11, 2020

(54) TIME SLOT SELECTION IN WIRELESS COMMUNICATION

(71) Applicant: Harman International Industries, Incorporated, Stamford, CT (US)

(72) Inventors: Guoxia Zhang, Shanghai (CN); Qingshan Zhang, Shanghai (CN); Zeng Yang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 476 days.

(21) Appl. No.: 14/916,322

(22) PCT Filed: Jul. 31, 2014

(86) PCT No.: PCT/CN2014/083390
§ 371 (c)(1),
(2) Date: Mar. 3, 2016

(87) PCT Pub. No.: WO2015/032250
PCT Pub. Date: Mar. 12, 2015

(65) Prior Publication Data
US 2016/0198460 A1    Jul. 7, 2016

(30) Foreign Application Priority Data
Sep. 6, 2013 (WO) .................. PCTCN2013083069

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2656* (2013.01); *H04L 1/1671* (2013.01); *H04L 5/0055* (2013.01); *H04W 4/06* (2013.01)

(58) Field of Classification Search
CPC .... H04W 72/0446; H04W 4/06; H04L 5/0055
See application file for complete search history.

(56) References Cited

U.S. PATENT DOCUMENTS 7,782,831 B1   8/2010   Feeney
8,762,518 B2   6/2014   Chen et al.
(Continued)

FOREIGN PATENT DOCUMENTS

CN   101291262 A   10/2008
CN   101507200 A    8/2009
(Continued)

OTHER PUBLICATIONS

Extended European Search Report for Application No. EP 14841642.3 dated Jul. 10, 2017, 10 pages.
(Continued)

*Primary Examiner* — Kodzovi Acolatse
*Assistant Examiner* — Farhad Ali
(74) *Attorney, Agent, or Firm* — Artegis Law Group, LLP

(57) ABSTRACT

A method for communicating messages in a channel of a wireless communication network is provided. In the channel, successive cycles, each of which including a predetermined number of successive time slots, are defined. The method may include: a first node obtaining a first list of its neighboring nodes before a first $q^{th}$ time slot; broadcasting a first message in the first $q^{th}$ time slot; receiving acknowledge information from other nodes within the network for one cycle after the first $q^{th}$ time slot; obtaining a second list of its neighboring nodes after the first $q^{th}$ time slot; and determining whether $q^{th}$ time slots are proper for communicating messages by the first node by checking whether all nodes on both the first and the second lists have received the first message based on the received acknowledge informa-
(Continued)

tion, each piece of which indicates whether a corresponding node has received the first message.

12 Claims, 5 Drawing Sheets

(51) Int. Cl.
*H04L 1/16* (2006.01)
*H04L 5/00* (2006.01)
*H04W 4/06* (2009.01)

(56) References Cited

U.S. PATENT DOCUMENTS

| | | | |
|---|---|---|---|
| 2007/0274320 A1 | 11/2007 | Joshi et al. | |
| 2008/0008138 A1* | 1/2008 | Pun | H04W 74/0841 370/338 |
| 2008/0316966 A1 | 12/2008 | Joshi et al. | |
| 2011/0010446 A1* | 1/2011 | Chen | H04L 45/20 709/224 |
| 2012/0026989 A1 | 2/2012 | Barghi et al. | |
| 2012/0113986 A1* | 5/2012 | Shaffer | H04L 1/1854 370/390 |
| 2012/0294142 A1 | 11/2012 | Kneckt et al. | |
| 2012/0314643 A1* | 12/2012 | Kim | H04W 72/005 370/312 |
| 2015/0078291 A1 | 3/2015 | Güner | |

FOREIGN PATENT DOCUMENTS

| | | |
|---|---|---|
| CN | 101692740 A | 4/2010 |
| CN | 102026292 A | 4/2011 |
| CN | 102625367 A | 8/2012 |
| CN | 103532845 A | 1/2014 |
| CN | 103889031 A | 6/2014 |
| CN | 104469964 A | 3/2015 |
| GB | 2423891 | 9/2006 |
| WO | 2008/005994 A1 | 1/2008 |
| WO | 2011/154911 A1 | 12/2011 |

OTHER PUBLICATIONS

International Search Report dated Oct. 29, 2014 in Application No. PCT/CN2014/083390.

* cited by examiner

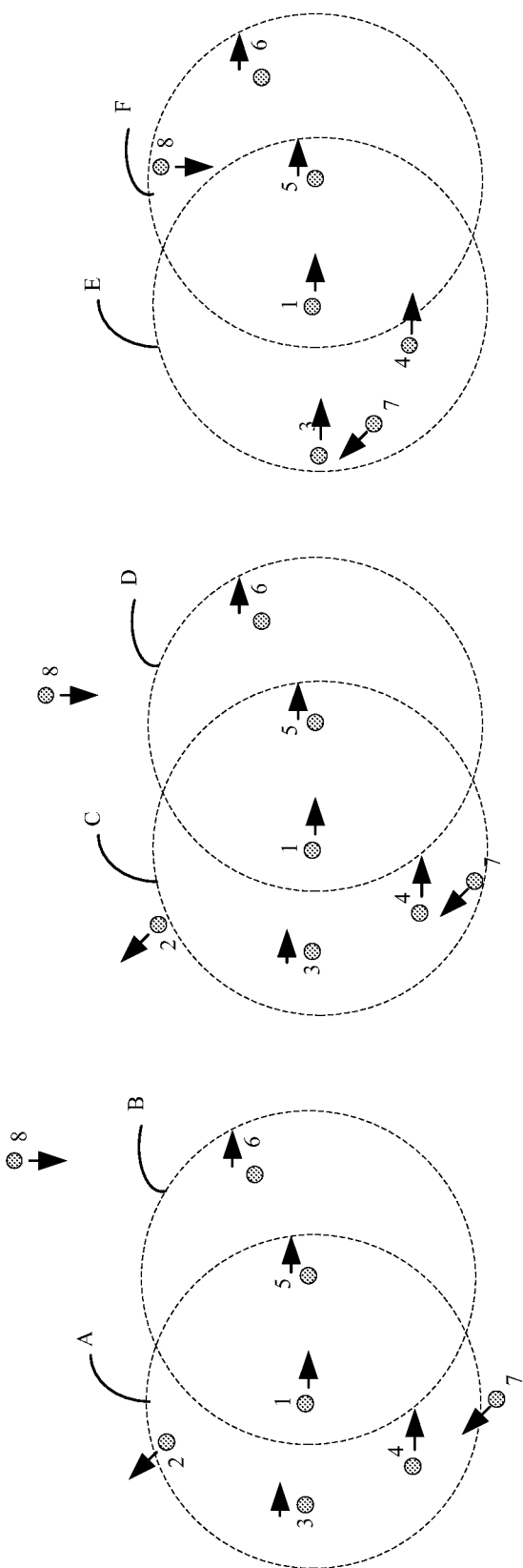

TIME SLOT SELECTION IN WIRELESS COMMUNICATION

CROSS-REFERENCE TO RELATED APPLICATIONS

The present application is a national stage application of the international application titled, "TIME SLOT SELECTION IN WIRELESS COMMUNICATION," filed on Jul. 31, 2014 and having application number PCT/CN2014/083390. This international application claims priority to the PCT patent application titled, "TIME SLOT SELECTION IN WIRELESS COMMUNICATION," filed on Sep. 6, 2013 and having application number PCT/CN2013/083069. The subject matter of these related applications is hereby incorporated herein by reference.

TECHNICAL FIELD

The present disclosure generally relates to time slot selection in wireless communication.

BACKGROUND

In a vehicular ad hoc network, vehicles may periodically broadcast safety messages, allowing vehicles in the network to receive safety messages from neighboring vehicles and predict possible collision threats. IEEE802.11p MAC based on CSMA/CA provides a method for communicating safety messages.

SUMMARY

In one embodiment, a method for communicating messages in a channel of a wireless communication network based on a time division multiple access protocol is provided. In the channel, successive cycles, each of which including a predetermined number of successive time slots, are defined. The method may include: a first node obtaining a first list of its neighboring nodes before a first $q^{th}$ time slot; broadcasting a first message in the first $q^{th}$ time slot; receiving acknowledge information from other nodes within the network for one cycle after the first $q^{th}$ time slot; obtaining a second list of its neighboring nodes after the first $q^{th}$ time slot; and determining whether $q^{th}$ time slots are proper for communicating messages by the first node by checking whether all nodes on both the first and the second lists have received the first message based on the received acknowledge information, each piece of which indicates whether a corresponding node has received the first message.

In some embodiments, if all nodes on both the first and the second lists have received the first message, determining that $q^{th}$ time slots are proper for communicating messages by the first node.

In some embodiments, if one node on both the first and the second lists has not received the first message, determining that $q^{th}$ time slots are not proper for communicating messages by the first node; selecting a $p^{th}$ time slot, and repeating the above method until a time slot which is proper for communicating messages by the first node is identified.

In one embodiment, a method for communicating messages in a channel of a wireless communication network based on a time division multiple access protocol is provided. In the channel, successive cycles, each of which including a predetermined number of successive time slots, are defined. The method may include: a first node obtaining a first list of its neighboring nodes before a first $q^{th}$ time slot; broadcasting a first message in the first $q^{th}$ time slot; receiving messages from other nodes within the network for one cycle after the first $q^{th}$ time slot; obtaining a second list of neighboring nodes based on the received messages; and determining whether a second $q^{th}$ time slot after the first $q^{th}$ time slot is proper for communicating a second message by the first node by checking whether all nodes on both the first and the second lists have received the first message based on acknowledge information, each piece of which indicates whether a corresponding node has received the first message, contained in the received messages.

In some embodiments, if all nodes on both the first and the second lists have received the first message, determining that the second $q^{th}$ time slot is proper for communicating a second message by the first node.

In some embodiments, if one node on both the first and the second lists has not received the first message, determining that the second $q^{th}$ time slot is not proper for communicating the second message by the first node; selecting a $p^{th}$ time slot, and repeating the above method until a time slot which is proper for communicating the second message by the first node is identified.

In some embodiments, the first message and the second message may be the same.

In some embodiments, the first list may be obtained by: receiving messages from other nodes for one cycle before the first $q^{th}$ time slot; and obtaining the first list based on the messages received in the cycle before the first $q^{th}$ time slot.

In some embodiments, the acknowledge information contained in the received message may include an identity of the first message, an identity of the first node, or an identity of $q^{th}$ time slot.

In one embodiment, a method for communicating messages in a channel of a wireless communication network based on a time division multiple access protocol is provided. In the channel, successive cycles, each of which including a predetermined number of successive time slots, are defined. The method may include: a first node obtaining a first list of its neighboring nodes before a first $m^{th}$ time slot; receiving messages from other nodes within the network for one cycle after the first $m^{th}$ time slot; determining whether there is a new node based on the received messages and the first list; and, if there is a new node, broadcasting a first message in a second $m^{th}$ time slot after the first $m^{th}$ time slot, where the first message may contain acknowledge information which indicates that the first node has received a message from the new node.

In one embodiment, a method for communicating messages in a channel of a wireless communication network based on a time division multiple access protocol is provided. In the channel, successive cycles, each of which including a predetermined number of successive time slots, are defined. The method may include: a first node obtaining a first list of its neighboring nodes before a first $m^{th}$ time slot; receiving messages from other nodes within the network for one cycle after the first $m^{th}$ time slot; determining based on the received messages whether the first node has received a message from a second node which is on the first list; and if the first node has not received a message from the second node, broadcasting a first message in a second $m^{th}$ time slot after the first $m^{th}$ time slot, where the first message contains acknowledge information which indicates that the first node fails to receive the message from the second node.

In one embodiment, a vehicle mounted system for communicating messages in a channel of a wireless communication network based on a time division multiple access protocol is provided. In the channel, successive cycles, each of which including a predetermined number of successive time slots, are defined. The system may include: a receiver, a transmitter and a processing device, where the processing device is configured to obtain a first list of neighboring nodes of the system before a first $q^{th}$ time slot; control the transmitter to broadcast a first message in the first $q^{th}$ time slot; obtain a second list of neighboring nodes of the system after the first $q^{th}$ time slot; and determine whether $q^{th}$ time slots are proper for communicating messages by the system by checking whether all nodes on both the first and the second lists have received the first message based on acknowledge information received by the receiver from other nodes within the network, where the acknowledge information is received by the receiver in a cycle after the first $q^{th}$ time slot, each piece of acknowledge information indicates whether a corresponding node has received the first message.

In some embodiments, if all nodes on both the first and the second lists have received the first message, the processing device may determine that $q^{th}$ time slots are proper for communicating messages by the system.

In some embodiments, if one node on both the first and the second lists has not received the first message, the processing device may determine that $q^{th}$ time slots are not proper for communicating messages by the system.

In one embodiment, a vehicle mounted system for communicating messages in a channel of a wireless communication network based on a time division multiple access protocol is provided. In the channel, successive cycles, each of which including a predetermined number of successive time slots, are defined. The system may include: a receiver, a transmitter and a processing device, where the processing device is configured to obtain a first list of neighboring nodes of the system before a first $q^{th}$ time slot; control the transmitter to broadcast a first message in the first $q^{th}$ time slot; obtain a second list of neighboring nodes of the system based on the received messages; and determine whether a second $q^{th}$ time slot after the first $q^{th}$ time slot is proper for communicating a second message by the system, by checking whether all nodes on both the first and the second lists have received the first message based on acknowledge information contained in messages which are received by the receiver from other nodes within the network, where the messages are received by the receiver in a cycle after the first $q^{th}$ time slot, and each piece of acknowledge information indicates whether a corresponding node has received the first message.

In some embodiments, if all nodes on both the first and the second lists have received the first message, the processing device may determine that the second $q^{th}$ time slot is proper for communicating a second message by the system.

In some embodiments, if one node on both the first and the second lists has not received the first message, the processing device may determine that the second $q^{th}$ time slot is not proper for communicating the second message by the system.

In some embodiments, the first message and the second message may be the same.

In some embodiments, the processing device may be configured to obtain the first list based on messages received by the receiver from other nodes within the network, where the messages are received in a cycle before the first $q^{th}$ time slot.

In some embodiments, the acknowledge information contained in the received message may include an identity of the first message, an identity of a node on which the system is mounted, or an identity of $q^{th}$ time slot.

In one embodiment, a vehicle mounted system for communicating messages in a channel of a wireless communication network based on a time division multiple access protocol is provided. In the channel, successive cycles, each of which including a predetermined number of successive time slots, are defined. The system may include: a receiver, a transmitter and a processing device, where the processing device is configured to obtain a first list of neighboring nodes of the system before a first $m^{th}$ time slot; determine whether there is a new node based on the first list and messages received by the receiver from other nodes within the network, where the messages are received by the receiver in a cycle after the first $m^{th}$ time slot; and, if there is a new node, control the transmitter to broadcast a first message in a second $m^{th}$ time slot after the first $m^{th}$ time slot, where the first message may contain acknowledge information which indicates that a first node, on which the system is mounted, has received a message from the new node.

In some embodiments, the acknowledge information contained in the first message may include an identity of the message, an identity of the new node, or an identity of a time slot in which the new node communicates the message.

In one embodiment, a vehicle mounted system for communicating messages in a channel of a wireless communication network based on a time division multiple access protocol is provided. In the channel, successive cycles, each of which including a predetermined number of successive time slots, are defined. The system may include: a receiver, a transmitter and a processing device, where the processing device is configured to obtain a first list of neighboring nodes of the system before a first $m^{th}$ time slot; determine whether a first node, on which the system is mounted, has received a message from a second node which is on the first list, based on messages received by the receiver from other nodes within the network, where the messages are received by the receiver in a cycle after the first $m^{th}$ time slot; and, if the first node has not received a message from the second node, control the transmitter to broadcast a first message in a second $m^{th}$ time slot after the first $m^{th}$ time slot, where the first message contains acknowledge information which indicates that the first node fails to receive the message from the second node.

In some embodiments, the acknowledge information contained in the first message may include an identity of the second node, or an identity of a time slot in which the second node communicates the message.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4 to FIG. 6 schematically illustrate examples of topologies of a vehicular ad hoc network according to one embodiment.

DETAILED DESCRIPTION

Figure 1:
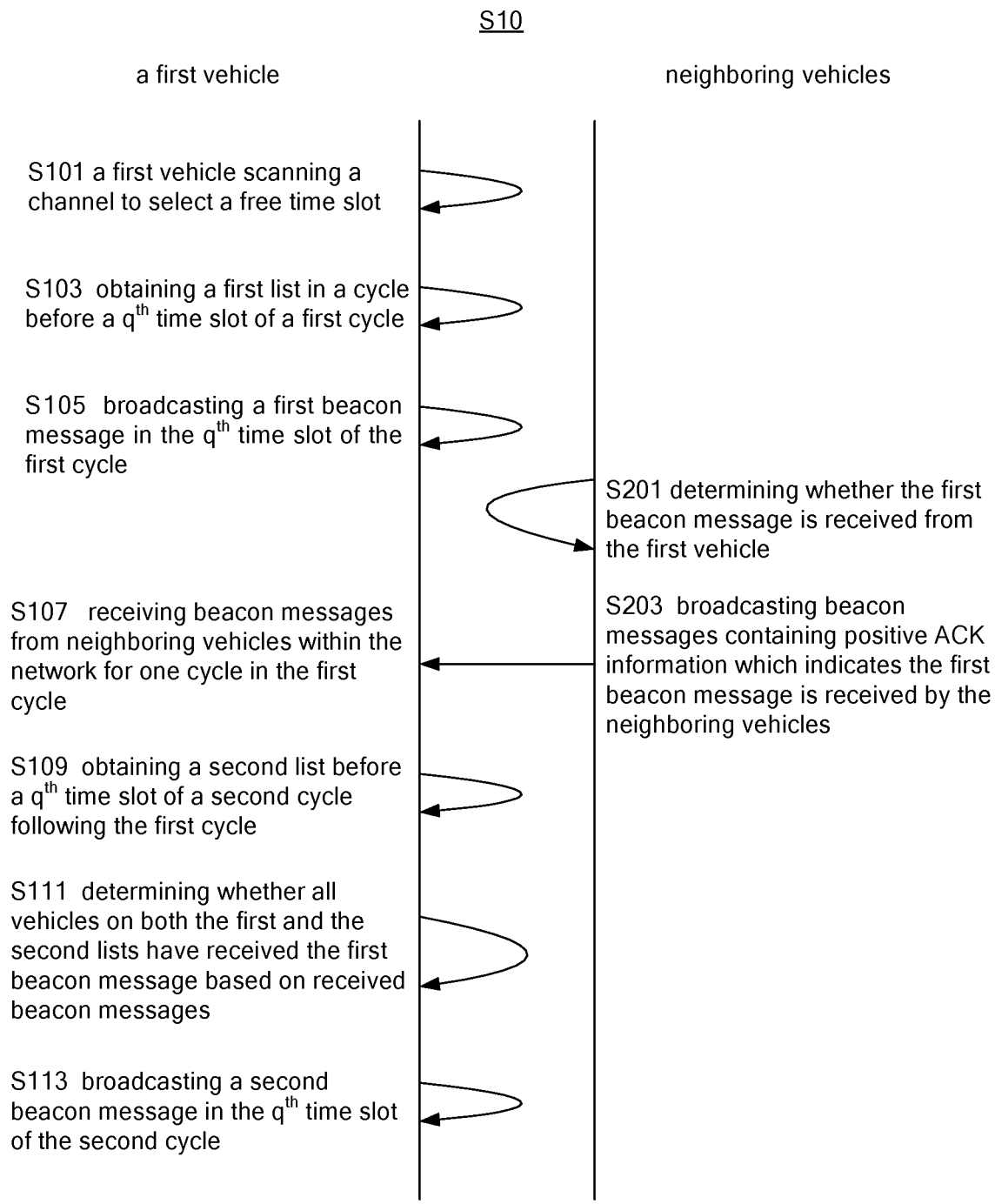
FIG. 1 illustrates a schematic flow chart of a communication method S10 for time slot selection according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 2:
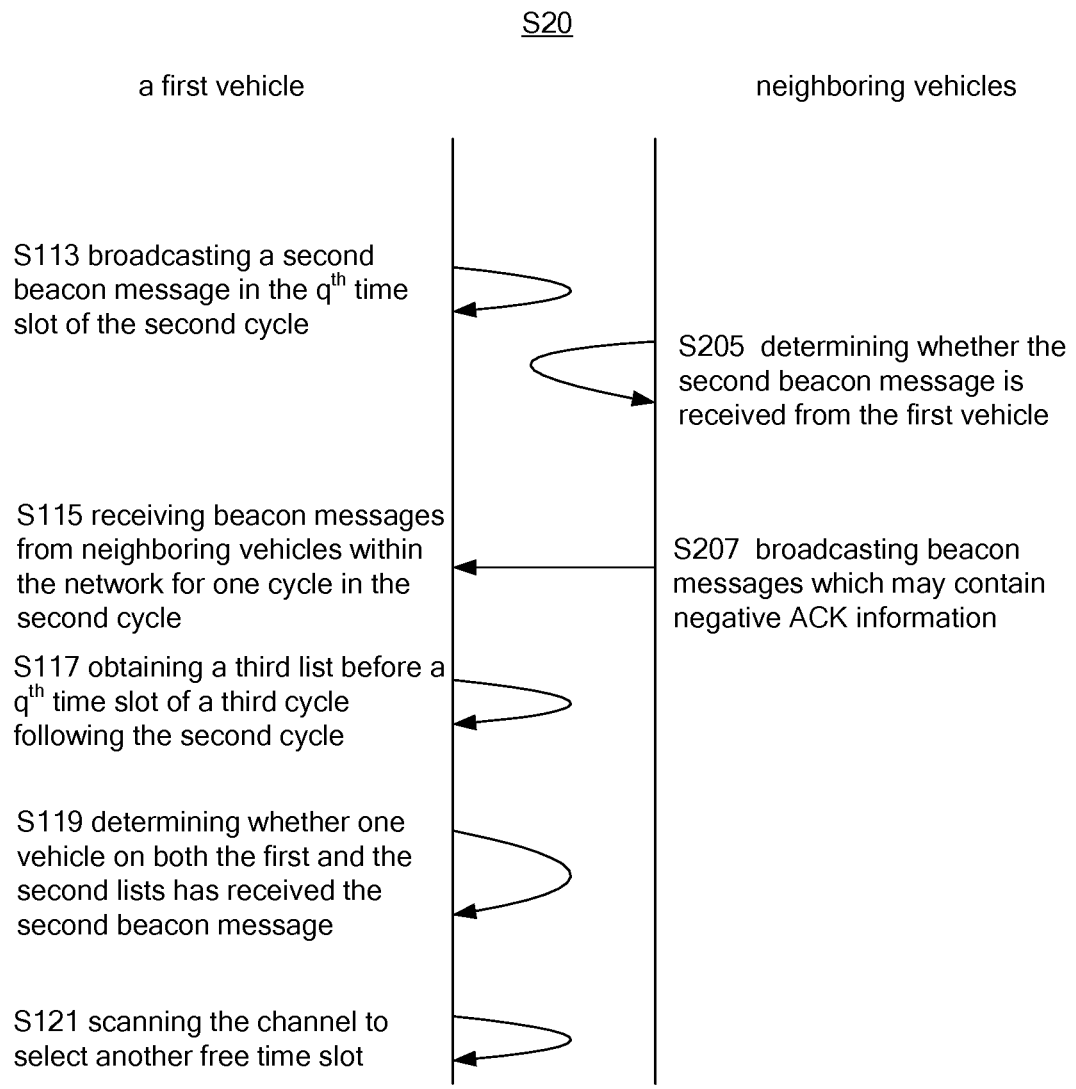
FIG. 2 illustrates a schematic flow chart of a communication method S20 for time slot selection according to one embodiment.

Referring to FIG. 1 and FIG. 2, embodiments of communication methods S10 and S20 for time slot selection in a channel of a wireless communication network based on a time division multiple access protocol are provided.

In a basic vehicular communication system, to ensure a traffic safety application, each moving vehicle updates and sends its own Basic Safety Message (BSM), such as a beacon message, once a cycle, e.g., 100 ms, over the WAVE short message (WSM) channel. In one embodiment, a slotted frame structure of one cycle is defined above the MAC layer.

Figure 3:
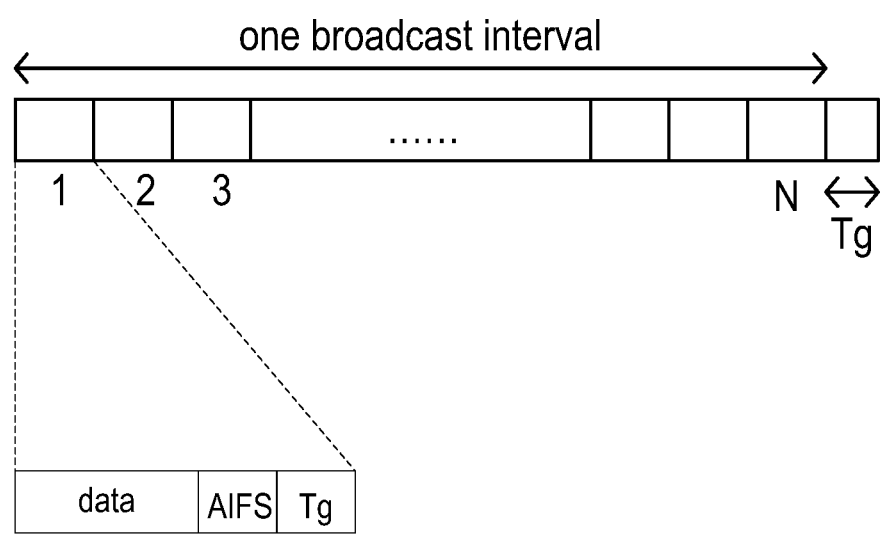
FIG. 3 schematically illustrates a slotted frame structure of one cycle according to one embodiment.

FIG. 3 schematically illustrates a slotted frame structure of one cycle. Referring to FIG. 3, time on the channel having a length of one cycle may be divided into N time slots. A time slot may be occupied by a vehicle to broadcast a periodic message, such as a beacon message.

As shown in FIG. 3, a time slot may include a first duration, shown as "data" for carrying one beacon message. In some embodiments, the first duration may equal to about 0.55 ms. A 200-byte data packet, which typically equal to a size of one beacon message, may be broadcasted in the first duration of one time slot. A time slot may further include a second duration, shown with "AIFS" and "Tg" which is lightly longer than AIFS (arbitration inter-frame space) defined in CSMA/CA. In some embodiments, the second duration may equal to about 1 μs. By introducing the second duration to a time slot, the communication channel access method of this disclosure may be applied substantially compatible with the existing CSMA/CA, without violating the IEEE.802.11p specification.

In some embodiments, besides N successive time slots, one cycle may further include a guard time (Tg) for synchronism. In some embodiments, the guard time of the cycle may equal to 1 ms.

It should be noted that the duration and the number of the time slot can be changed to meet a specific requirement of safety applications.

Referring to FIG. 1 and FIG. 2, the first vehicle represents a new node wants to broadcast its beacon message in the network.

In S101, a first vehicle scanning a channel to select a free time slot.

Before the first vehicle broadcasts its beacon message in the network, the first vehicle may scan a channel for a whole cycle and select a free time slot in the channel. During scanning the channel, the first vehicle may determine which time slot is free according to received beacon messages from its neighboring vehicles. In this embodiment, the first vehicle may select a $q^{th}$ time slot to broadcast its beacon message.

FIGS. 4 to 6 schematically illustrate examples of topologies of a vehicular ad hoc network according to one embodiment. Referring to FIG. 4, there are a plurality of vehicles (represented by a plurality of round dots) communicating within the network. The network may be a vehicular ad hoc network (VANET).

Referring to FIG. 4 to FIG. 6, dotted line circles A, C and E represent topologies at different time points, where a vehicle 1 and its neighboring vehicles are communicating in a corresponding circle. For example, in FIG. 4, the vehicle 1 and its neighboring vehicles 2, 3, 4 and 5 are communicating with each other in the circle A. That is, the vehicle 1 can receive beacon messages from the vehicles 2, 3, 4 and 5. Further, dotted line circles B, D and F represent topologies at different time points, where a vehicle 5 and its neighboring vehicles are communicating with each other in a corresponding circle. For example, in FIG. 4, the vehicle 5 and its neighboring vehicles 1 and 6 are communicating with each other in the circle B.

In FIG. 4 to FIG. 6, each round dot is marked with an arrow, which represents a vehicle's moving direction. For example, in FIG. 4, vehicles 7 and 8 are moving towards the circle A and B, respectively.

In this embodiment, the vehicle 1 may represent the first vehicle which wants to broadcast a beacon message in the communication channel.

In S103, the first vehicle obtaining a first list in a cycle before a $q^{th}$ time slot of a first cycle.

Here, a list of a vehicle may be obtained based on periodical beacon messages received from neighboring vehicles. In some embodiments, the vehicle may update its list in time, for example, the list may be updated when a beacon message is received from a new neighboring vehicle. Referring to FIG. 4, before broadcasting in the $q^{th}$ time slot of the first cycle, the vehicle 1 may receive beacon messages from the vehicles 2, 3, 4 and 5, and obtaining its list which lists out the vehicles 2, 3, 4 and 5.

In S105, the first vehicle broadcasting a first beacon message in the $q^{th}$ time slot of the first cycle.

Figure 7:
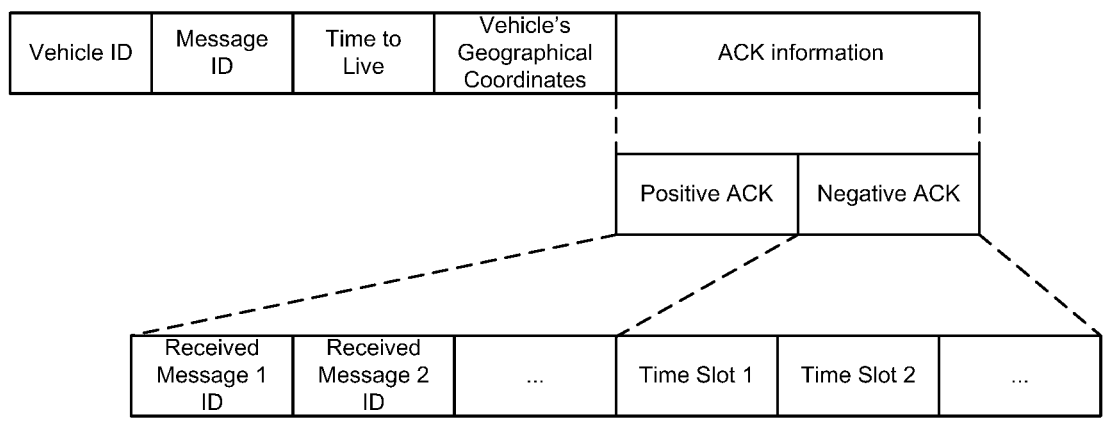
FIG. 7 schematically illustrates a beacon message data structure according to one embodiment.

FIG. 7 schematically illustrates a beacon message data structure according to one embodiment.

Referring to FIG. 7, a beacon message has a plurality of fields which may include Vehicle ID, Message ID, Time to Live, Vehicle's Geographical Coordinates, and acknowledge (ACK) information. The Vehicle ID is used to indicate an identity of a sender which broadcasts the beacon message. The Message ID is used to indicate an identity of the beacon message. The Vehicle's Geographical Coordinates is used to indicate the sender's geographical position.

The ACK information may further include positive ACK information and negative ACK information. A positive ACK information may be used to indicate a situation where a new beacon message from a new vehicle is received by its neighboring vehicles within the network, where the new vehicle means a vehicle wants to broadcast a beacon message in the network for the first time. Thus, the new vehicle may know whether its beacon message is received safely by its neighboring vehicles in the network based on positive ACK information contained in its received messages.

In some embodiments, the positive ACK information may include an identity of the new beacon message, as shown in FIG. 7. In some embodiments, the positive ACK information may include an identity of the new vehicle which sends out the new beacon message, or an identity of a time slot, in which the new vehicle broadcasts the new beacon message. Both the identity of a beacon message and the identity of a vehicle are unique.

Referring to FIG. 7, the negative ACK information may be used to indicate a situation where a receiver receives a beacon message from a sender in a $m^{th}$ time slot of a cycle, but the receiver fails to receive a beacon message from the sender in the $m^{th}$ time slot after the cycle. In some embodiments, the negative ACK information may include an identity of the $m^{th}$ time slot, such as the number m. In some embodiments, the negative ACK information may include an identity of the sender vehicle. That is, after receiving beacon messages within the network, the sender vehicle may know that its beacon message is not received safely by its neighboring vehicles based on the negative ACK information contained in the received beacon messages.

In some embodiments, the fields of positive ACK information and/or negative ACK information are optional. For example, if there is no new vehicle broadcasting within the network, the field of positive ACK information may be empty.

In S201, neighboring vehicles determining whether the first beacon message is received from the first vehicle.

Similar to S103, each of the neighboring vehicles may maintain its list according to its received periodical beacon messages, respectively. Therefore, the neighboring vehicles may determine that the first beacon message is received from the first vehicle (new vehicle) based on its previous and current lists.

Generally, the neighboring vehicles and the first vehicle are neighbors mutually, that is, they can receive their beacon messages from each other. So the neighboring vehicles may receive the first beacon message from the first vehicle, of course, there is a situation one of the neighboring vehicles fails to receive the first beacon message from the first vehicle, which will be described below. Here, it is assumed that all the neighboring vehicles may receive the first beacon message safely from the first vehicle.

Referring to FIG. 4, the vehicles 2, 3, and 4 may receive the first beacon message from the vehicle 1.

In S203, the neighboring vehicles broadcasting beacon messages containing positive ACK information which indicates the first beacon message is received by the neighboring vehicles. As the neighboring vehicles have received a new message (the first beacon message) from a new vehicle (the first vehicle), each of the neighboring vehicles may broadcast its beacon message including positive ACK information, such as the ID of the first vehicle, the ID of the first beacon message, or an ID of a time slot in which the first beacon message is broadcast, to indicate that the first beacon message broadcast by the first vehicle is received safely by the neighboring vehicles.

In S107, the first vehicle receiving beacon messages from neighboring vehicles within the network for one cycle in the first cycle. The first vehicle may receive beacon messages, which contain positive ACK information of the first vehicle, from its neighboring vehicles within the network.

In S109, the first vehicle obtaining a second list before a $q^{th}$ time slot of a second cycle following the first cycle.

After a time period of one cycle, the first list of the first vehicle may vary with the movements of the first vehicle and its neighboring vehicles. Similar to S103, during a time period of the first cycle, the first vehicle may update its list of neighboring vehicles in time if the first vehicle receives a new beacon message from a new neighboring vehicle.

Referring to FIG. 5, assuming that during a time period of the first cycle, the vehicle 2 moves outside the circle A, while the vehicle 7 moves into the circle A. That is, the vehicle 1 can not receive a beacon message from the vehicle 2, but can receive a beacon message from the vehicle 7 (assuming that the vehicle 7 broadcasts its beacon message within the network during this time period). Upon receiving the beacon message from the vehicle 7, the vehicle 1 updates its previous list (the first list) to a current list (the second list). The second list of the vehicle 1 may list out the vehicles 3, 4, 5 and 7 in the time period of the first cycle.

In S111, the first vehicle determining whether all vehicles on both the first and the second lists have received the first beacon message based on received beacon messages.

As described above, a vehicle may broadcast a beacon message containing positive ACK information if it receives a new beacon message from a new neighboring vehicle. Therefore, the positive ACK information contained in the received beacon messages may be used to determine whether all vehicles on both the first and the second lists have received the first beacon message safely.

Referring to FIG. 4 and FIG. 5, vehicles 3, 4 and 5 are included on both the first and second lists, and vehicles 2 and 7 are not on both the first and second lists. Messages from the vehicles 2 and 7 are not taken into consideration. Therefore, positive ACK information contained in beacon messages of vehicles 3, 4 and 5 are considered. For example, if the vehicle 3 receives the first beacon message safely from the vehicle 1, the vehicle 3 may broadcast a beacon message containing an ID of the first beacon message, or an ID of the vehicle 1. The vehicle 1 may receive this beacon message from the vehicle 3, and determines that the vehicle 3 has received its first beacon message safely.

In S113, the first vehicle broadcasting a second beacon message in the $q^{th}$ time slot of the second cycle. In some embodiments, if, all vehicles on both the first and the second lists have received the first beacon message safely, the first vehicle may determine that $q^{th}$ time slots in subsequent cycles are proper for communicating messages by it. For example, if beacon messages from the vehicles 3, 4 and 5 contain positive ACK information indicating that the first beacon message is received from the vehicle 1, the vehicle 1 determines that its reservation of the $q^{th}$ time slot of the first cycle is successful. And the vehicle 1 will broadcast the second beacon message in the $q^{th}$ time slot of the second cycle following the first cycle.

There is a situation where the first beacon message may not be received safely by neighboring vehicles within the network. In this case, if one neighboring vehicle on both the first and the second lists has not received the first beacon message, the method goes to S121, that is, the first vehicle will scan the channel to select another free time slot.

For example, the vehicle 6 also broadcasts its beacon message in the $q^{th}$ time slot of the first cycle as the vehicle 1 does. Therefore, a collision may occur which can be detected by the vehicle 5, as both vehicles 1 and 6 are neighbors of the vehicle 5. In this case, the vehicle 1 may not receive positive ACK information from the vehicle 5. That is, one vehicle on both the first and the second lists has not received the first beacon message. Thus, the vehicle 1 determines that $q^{th}$ time slots are not proper for communicating messages, and starts to scan the channel to select another free time slot.

After S113, the method goes to S20 shown in FIG. 2.

In S205, the neighboring vehicles determining whether the second beacon message is received from the first vehicle. As described in S105 and S113, the first vehicle has broadcast the first and second beacon messages in the $q^{th}$ time slot of the first cycle and in the $q^{th}$ time slot of the second cycles, respectively. However, there is a situation where one of the neighboring vehicles may fail to receive the second beacon message.

Referring to FIG. 6, the vehicle 8 moves into the circle F during the time period of the second cycle. As the vehicle 8 is not in a same circle with the vehicle 5, it is likely that the vehicle 8 also broadcasts its beacon message in the $q^{th}$ time slot. Thus, a collision on the $q^{th}$ time slot between the vehicles 1 and 8 may be detected by the vehicle 5, as both the vehicles 1 and 8 are neighbors of the vehicle 5.

In S207, the neighboring vehicles broadcasting beacon messages which may contain negative ACK information. In some embodiments, if one of the neighboring vehicles determines it fails to receive the second beacon message from the first vehicle in the $q^{th}$ time slot of the second cycle, while it has received the first beacon message from the first vehicle in the $q^{th}$ time slot of the first cycle, the neighboring vehicle may broadcast its beacon message containing negative ACK information of an identity of $q^{th}$ time slot, such as the number q. For example, as described in S105, if the collision in the $q^{th}$ time slot between the vehicles 1 and 8 is detected by the vehicle 5, the vehicle 5 may identify the number q in the field of negative ACK information.

In S115, the first vehicle receiving beacon messages from neighboring vehicles within the network for one cycle in the second cycle.

In S117, the first vehicle obtaining a third list before a $q^{th}$ time slot of a third cycle following the second cycle.

Similar to S103, the first vehicle may update its list in time based on its received beacon messages. And the third list may list out its neighboring vehicles in the time period of the second cycle.

Referring to FIG. 6, assuming that during the time period of the second cycle, the neighboring vehicles of the vehicle 1 are unchanged compared with that shown in FIG. 5. That is, the third list of the vehicle 1 may still contain the neighboring vehicles 3, 4, 5 and 7.

In S119, the first vehicle determining whether one vehicle on both the first and the second lists has received the second beacon message.

In some embodiments, whether or not one vehicle on both the first and the second lists has received the second beacon message may be determined based on negative ACK information. Then, the first vehicle may determine whether $q^{th}$ time slots are still proper for communicating messages based on the negative ACK information contained in beacon messages which are received within the network.

As described in S113, the first vehicle broadcasts its second beacon message in the $q^{th}$ time slot of the second cycle. In subsequent cycles, by analyzing whether or not its received beacon messages contain negative ACK information (i.e. an identity of $q^{th}$ time slot), the first vehicle may know whether or not $q^{th}$ time slots are still proper for communicating messages by it.

Referring to FIG. 6, because the vehicle 5 is included on both the second and the third lists, and the vehicle 5 broadcasts its beacon message containing negative ACK information of the number q, the vehicle 1 may determine the second beacon message is not received safely by neighboring vehicles within the network.

In this case, the method may go to S121, the first vehicle scanning the channel to select another free time slot. For example, the first vehicle may select a $p^{th}$ time slot, and repeating the above method until a time slot which is proper for communicating messages by the first vehicle is identified.

In some embodiments, when the vehicle 8 moves into the same circle with the vehicle 1, and if there is no such a vehicle 5 (which represents a common neighboring vehicle of the vehicles 1 and 8) existed, the collision between the vehicles 1 and 8 can still be detected using the CSMA/CA mechanism if the vehicle 8 broadcasts its beacon message on the same time slot with the vehicle 1.

Alternatively, if there is no negative ACK information received by the vehicle 1, it means $q^{th}$ time slots of subsequent cycles can be used by vehicle 1, and the vehicle 1 may go on to broadcast its beacon message in $q^{th}$ time slots of subsequent cycles.

According to the above embodiments, a vehicle in a vehicular ad hoc network can change its selection of time slot timely under conditions of a collision or effect of topology changes due to its mobility, thus a predictable and reliable communication can be guaranteed.

According to one embodiment of the present disclosure, a vehicle mounted system for communicating messages in a channel of a wireless communication network based on a time division multiple access protocol is provided. In the channel, successive cycles, each of which including a predetermined number of successive time slots, are defined. In some embodiments, the vehicle mounted system may broadcast a message, once a cycle, e.g., 100 ms, over a WAVE short message (WSM) channel.

In some embodiments, the system may include a processing device, a receiver and a transmitter. In some embodiments, the transmitter is adapted for broadcasting a beacon message in a time slot once a cycle within the network, which time slot may be selected according to time slot selection methods described above. In some embodiments, the receiver is adapted for receiving beacon messages within the network. In some embodiments, the system may include a storing device for storing a list, which may list out neighboring vehicles of a vehicle on which the system is mounted. In some embodiments, a previous list and a current list may be stored in the storing device. The current list is an updated list relative to the previous list. The current list may be the same or different from the previous list.

In some embodiments, the vehicle mounted system may include: a receiver, a transmitter and a processing device, where the processing device is configured to obtain a first list of neighboring nodes of the system before a first $q^{th}$ time slot; control the transmitter to broadcast a first message in the first $q^{th}$ time slot; obtain a second list of neighboring nodes of the system after the first $q^{th}$ time slot; and determine whether $q^{th}$ time slots are proper for communicating messages by the system by checking whether all nodes on both the first and the second lists have received the first message based on acknowledge information received by the receiver from other nodes within the network, where the acknowledge information is received by the receiver in a cycle after the first $q^{th}$ time slot, each piece of acknowledge information indicates whether a corresponding node has received the first message.

In some embodiments, the acknowledge information contained in the received message may include an identity of the first message, an identity of the first node, or an identity of $q^{th}$ time slot.

In some embodiments, the processing device may be configured to perform the methods S10 and S20 described above. In some embodiments, the processing device may be a CPU, a DSP etc, or any combination thereof.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for communicating messages in a channel of a wireless communication network based on a time division multiple access protocol, where successive cycles, each of which comprising a predetermined number of successive time slots, are defined in the channel, the method comprising, at a first node within the network:
generating a first list of neighboring nodes within the network before a first $q^{th}$ time slot, wherein the first list lists a first set of one or more nodes that neighbor the first node;
broadcasting a first message in the first $q^{th}$ time slot;
receiving acknowledge information from the neighboring nodes for one cycle after the first $q^{th}$ time slot;
generating a second list of neighboring nodes within the network after the first $q^{th}$ time slot, wherein the second list lists a second set of one or more nodes that neighbor the first node; and
determining whether one or more $q^{th}$ time slots are proper for communicating messages by the first node by checking whether all nodes that are common to both the first and the second lists have received the first message based on the received acknowledge information, where each portion of the acknowledge information indicates whether a corresponding node has received the first message, wherein:
in response to one node that is common to both the first and the second lists has not received the first message, then the one or more $q^{th}$ time slots are not proper for communicating messages by the first node, and the method further comprises selecting a $p^{th}$ time slot, and repeating the steps of generating the first list, broadcasting the first message, receiving the acknowledge information, and generating the second list, and
in response to all nodes that are common to both the first and the second lists have received the first message, then the one or more $q^{th}$ time slots are proper for communicating messages by the first node.

2. The method of claim 1, further comprising:
generating a third list of neighboring nodes within the network before a first $m^{th}$ time slot, wherein the third list lists a third set of one or more nodes that neighbor the first node;
receiving messages from other nodes within the network for one cycle after the first $m^{th}$ time slot;
determining whether there is a new node within the network based on the received messages and the third list; and
if there is a new node, broadcasting a second message in a second $m^{th}$ time slot after the first $m^{th}$ time slot, where the second message includes acknowledge information indicating that the first node has received a message from the new node.

3. The method of claim 1, further comprising:
generating a third list of neighboring nodes within the network before a first $m^{th}$ time slot, wherein the third list lists a third set of one or more nodes that neighbor the first node;
receiving messages from other nodes within the network for one cycle after the first $m^{th}$ time slot;
determining, based on the received messages, whether the first node has received a message from a second node which is on the third list; and
if the first node has not received a message from the second node, broadcasting a second message in a second $m^{th}$ time slot after the first $m^{th}$ time slot, where the second message includes acknowledge information indicating that the first node failed to receive the message from the second node.

4. A method for communicating messages in a channel of a wireless communication network based on a time division multiple access protocol, where successive cycles, each of which comprising a predetermined number of successive time slots, are defined in the channel, the method comprising, at a first node within the network:
generating a first list of neighboring nodes within the network before a first $q^{th}$ time slot, wherein the first list lists a first set of one or more nodes that neighbor the first node;
broadcasting a first message in the first $q^{th}$ time slot;
receiving messages from the neighboring nodes for one cycle after the first $q^{th}$ time slot;
generating a second list of neighboring nodes within the network based on the received messages, wherein the second list lists a second set of one or more nodes that neighbor the first node; and
determining whether a second $q^{th}$ time slot after the first $q^{th}$ time slot is proper for communicating a second message by the first node by checking whether all nodes that are common to both the first and the second lists have received the first message based on acknowledge information, where each portion of the acknowledge information indicates whether a corresponding node has received the first message, wherein:
in response to one node that is common to both the first and the second lists has not received the first message, then the second $q^{th}$ time slot is not proper for communicating the second message by the first node; and the method further comprises selecting a $p^{th}$ time slot, and repeating the steps of generating the first list, broadcasting the first message, receiving the messages and generating the second list; and
in response to all nodes that are common to both the first and the second lists have received the first message, then the second $q^{th}$ time slot is proper for communicating the second message by the first node.

5. The method according to claim 4, further comprising receiving messages from other nodes within the network for one cycle before the first $q^{th}$ time slot; and where generating the first list is based on the messages received in the cycle before the first $q^{th}$ time slot.

6. The method according to claim 4, where the acknowledge information is included in the received messages and comprises at least one of an identity of the first message, an identity of the first node, or an identity of the $q^{th}$ time slot.

7. A vehicle mounted system for communicating messages in a channel of a wireless communication network based on a time division multiple access protocol, where successive cycles, each of which comprising a predetermined number of successive time slots, are defined in the channel, the system comprises a receiver, a transmitter and a processing device, where the processing device is configured to, at a first node within the network:
- generate a first list of neighboring nodes within the network before a first $q^{th}$ time slot, wherein the first list lists a first set of one or more nodes that neighbor the first node;
- control the transmitter to broadcast a first message in the first $q^{th}$ time slot;
- generate a second list of neighboring nodes within the network after the first $q^{th}$ time slot, wherein the second list lists a second set of one or more nodes that neighbor the first node; and
- determine whether $q^{th}$ time slots are proper for communicating messages by the system by checking whether all nodes that are common to both the first and the second lists have received the first message based on acknowledge information received by the receiver from other nodes within the network, where the acknowledge information is received by the receiver in a cycle after the first $q^{th}$ time slot, and each portion of the acknowledge information indicates whether a corresponding node has received the first message, wherein:
  - in response to one node that is common to both the first and the second lists has not received the first message, then the processing device is configured to determine that $q^{th}$ time slots are not proper for communicating messages by the system; and
  - in response to all nodes that are common to both the first and the second lists have received the first message, then the processing device is configured to determine that $q^{th}$ time slots are proper for communicating messages by the system.

8. The vehicle mounted system of claim 7, wherein the processing device is further configured to:
- generate a third list of neighboring nodes within the network before a first $m^{th}$ time slot, wherein the third list lists a third set of one or more nodes that neighbor the first node;
- determine whether there is a new node based on the third list and messages received by the receiver from other nodes within the network in a cycle after the first $m^{th}$ time slot; and
- if there is a new node, control the transmitter to broadcast a second message in a second $m^{th}$ time slot after the first $m^{th}$ time slot, where the second message includes acknowledge information indicating that the first node, on which the system is mounted, has received a message from the new node.

9. The vehicle mounted system of claim 7, wherein the processing device is further configured to:
- generate a third list of neighboring nodes within the network before a first $m^{th}$ time slot, wherein the third list lists a third set of one or more nodes that neighbor the first node;
- determine whether the first node, on which the system is mounted, has received a message from a second node included in the third list based on messages received by the receiver from other nodes within the network in a cycle after the first $m^{th}$ time slot; and
- if the first node has not received a message from the second node, control the transmitter to broadcast a second message in a second $m^{th}$ time slot after the first $m^{th}$ time slot, where the second message includes acknowledge information indicating that the first node failed to receive the message from the second node.

10. A vehicle mounted system for communicating messages in a channel of a wireless communication network based on a time division multiple access protocol, where successive cycles, each of which comprising a predetermined number of successive time slots, are defined in the channel, the system comprises a receiver, a transmitter and a processing device, where the processing device is configured to, at a first node within the network:
- generate a first list of neighboring nodes within the network before a first $q^{th}$ time slot, wherein the first list lists a first set of one or more nodes that neighbor the first node;
- control the transmitter to broadcast a first message in the first $q^{th}$ time slot;
- generate a second list of neighboring nodes within the network based on messages received from other nodes in the network, wherein the second list lists a second set of one or more nodes that neighbor the first node; and
- determine whether a second $q^{th}$ time slot after the first $q^{th}$ time slot is proper for communicating a second message by the system by checking whether all nodes that are common to both the first and the second lists have received the first message based on acknowledge information included in the messages which are received by the receiver from the other nodes within the network in a cycle after the first $q^{th}$ time slot, and each portion of the acknowledge information indicates whether a corresponding node has received the first message, wherein:
  - in response to one node that is common to both the first and the second lists has not received the first message, then the processing device is configured to determine that the second $q^{th}$ time slot is not proper for communicating the second message by the system; and
  - in response to all nodes that are common to both the first and the second lists have received the first message, then the processing device is configured to determine that the second $q^{th}$ time slot is proper for communicating a second message by the system.

11. The vehicle mounted system according to claim 10, where the processing device is further configured to generate the first list based on messages received by the receiver from other nodes within the network in a cycle before the first $q^{th}$ time slot.

12. The vehicle mounted system according to claim 10, wherein the acknowledge information included in each of the received messages comprises at least one of an identity of the first message, an identity of a node on which the system is mounted, or an identity of the $q^{th}$ time slot.

* * * * *